United States Patent [19]

Sananikone

[11] Patent Number: 5,205,163

[45] Date of Patent: Apr. 27, 1993

[54] METHOD AND APPARATUS FOR DETERMINING THE TORQUE APPLIED TO A DRILLSTRING AT THE SURFACE

[75] Inventor: Prasert Sananikone, Saint Nom La Breteche, France

[73] Assignee: Schlumberger Technology Corporation, Houston, Tex.

[21] Appl. No.: 718,061

[22] Filed: Jun. 20, 1991

[30] Foreign Application Priority Data

Oct. 7, 1990 [EP] European Pat. Off. ........ 90201862.1

[51] Int. Cl.$^5$ .............................................. E21B 44/00
[52] U.S. Cl. ...................................... 73/151; 166/250
[58] Field of Search ................. 73/151, 152, 153, 155; 166/250

[56] References Cited

U.S. PATENT DOCUMENTS

| Re. 28,436 | 6/1975 | Vitter et al. ............................. 73/151 |
| 2,691,300 | 10/1954 | Morris .................................... 73/151 |
| 2,775,889 | 1/1957 | Decker ................................... 73/151 |
| 3,782,190 | 1/1974 | Pittman .................................. 73/151 |
| 4,285,236 | 8/1981 | Chien ..................................... 73/151 |
| 4,471,663 | 9/1984 | Wallace . | |
| 4,549,431 | 10/1985 | Soeiinah ................................ 73/151 |
| 4,685,329 | 8/1987 | Burgess ................................. 73/151 |
| 4,715,451 | 12/1987 | Bseisu . | |
| 4,760,735 | 8/1988 | Sheppard et al. ..................... 73/151 |
| 4,893,496 | 1/1990 | Bau et al. .............................. 73/151 |
| 4,958,125 | 9/1990 | Jardine et al. ........................ 73/151 |
| 4,972,703 | 11/1990 | Ho ........................................ 73/151 |

FOREIGN PATENT DOCUMENTS 0155368  9/1985  European Pat. Off. .
63-144781  6/1988  Japan .

OTHER PUBLICATIONS

Halsey, Kyllingstad & Kylling "Torque feedback used to cure slip-stick motion"—SPE 18049 1988.

Primary Examiner—Hezron E. Williams
Assistant Examiner—George Dombroske
Attorney, Agent, or Firm—John J. Ryberg; Wayne I. Kanak

[57] ABSTRACT

The invention relates to the determination of the torque $T_s$ acting at the surface in a drillstring while drilling a borehole, the drillstring being rotated by rotating driving elements which include an electrical motor with an output shaft. The method comprises the steps of: measuring the angular acceleration $\gamma$ of said shaft; measuring the torque $T_m$ of said motor; determining the gear ratio G; determining the moment of inertia Mt of said rotating driving elements; and determining the torque $T_s$ from the values of $\gamma$, $T_m$, G and Mt.

12 Claims, 4 Drawing Sheets

Fig.2
Fig.3
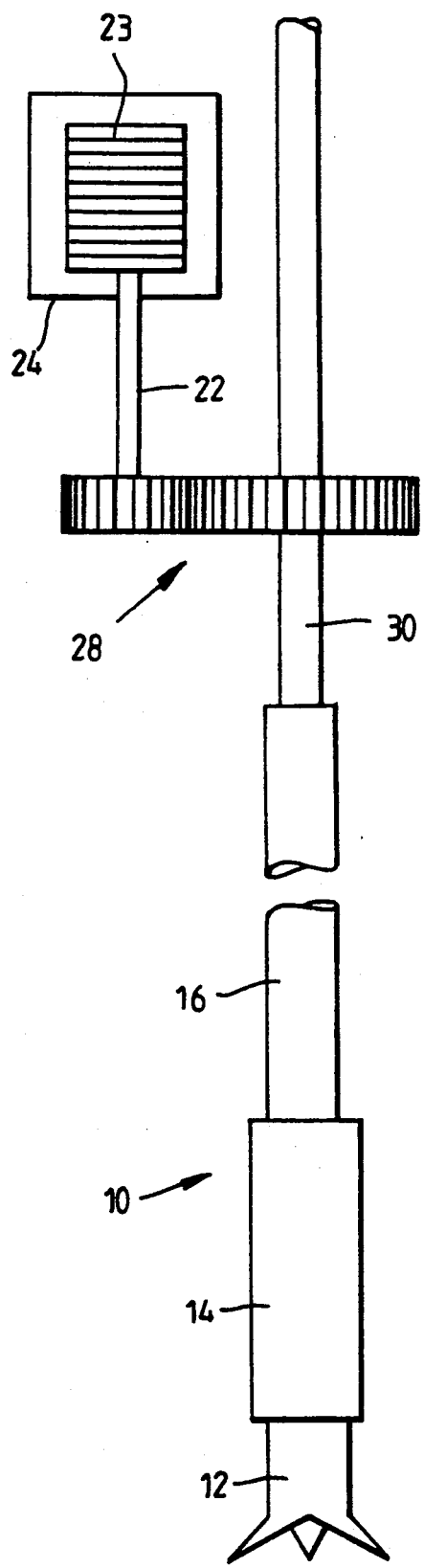
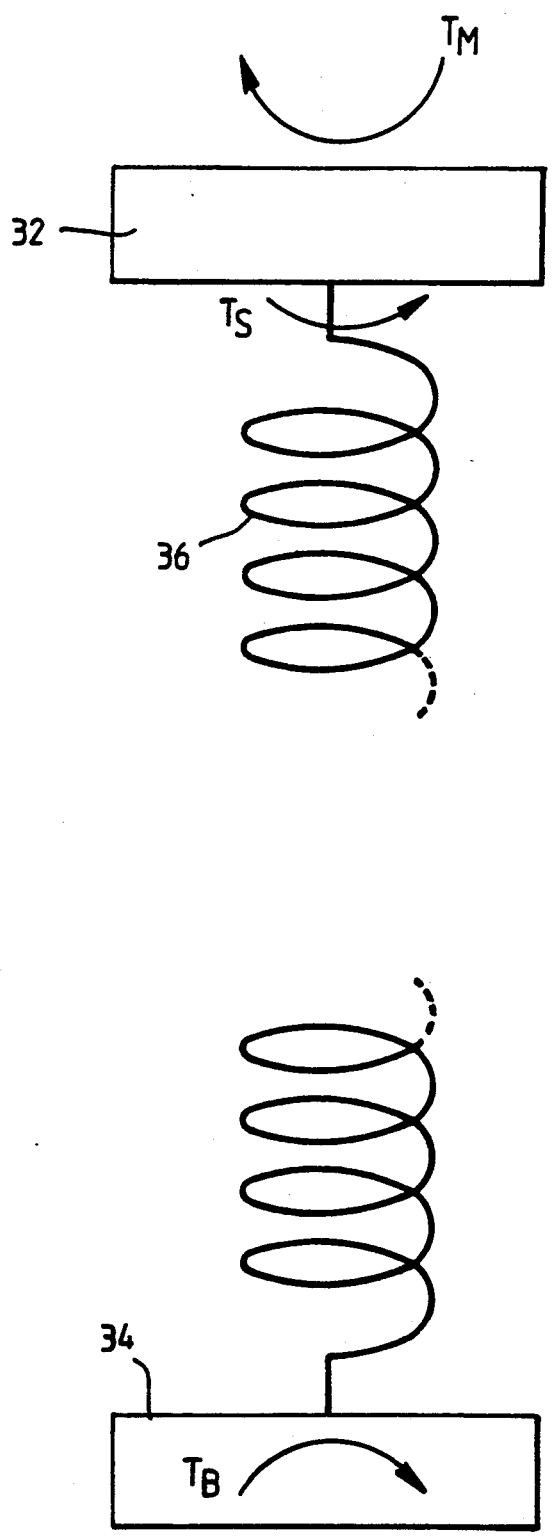

METHOD AND APPARATUS FOR DETERMINING THE TORQUE APPLIED TO A DRILLSTRING AT THE SURFACE

BACKGROUND

1. Field of the Invention

The present invention concerns a method and apparatus for determining the torque acting at the surface in a drillstring while drilling a borehole and its application to minimize the fluctuations of the torque in the drillstring so as to produce a more uniform motion of the drillstring.

The drillstring is composed of a drillbit and hollow drillpipes screwed end to end to each other to form a long pipe which can be several thousand meters long. The drillstring is rotated from the surface by an electrical motor, the shaft of which is coupled to the drillstring either, for a rotary table drilling system, by gears, a rotary table and a driving pipe of square section, called "kelly", or by gears only in the case of a top drive drilling system. The driller tries to keep the drillstring rotational speed relatively constant, at an optimal speed so as to maximize the rate of penetration of the drillbit. However, due to the relative elasticity of the drillstring and to its friction along the wall of the borehole, the drillbit rotational speed varies and is not the same as the drillstring rotational speed at the surface. This induces torsional vibration in the drillstring.

Minimizing drillstring torsional vibration is highly desirable since it improves the life expectancy of the drillstring due to a reduction in the cyclic loading of the drillpipes, it reduces the probability of having a stuck pipe or a break of a drillpipe ("twist-off"), and it allows a better control of the direction of the well due to a more regular speed of rotation of the drill bit.

2. Prior Art

The usual method which is used to reduce drillstring torsional vibration is to vary the weight on bit and/or the rotational speed of the drillstring on a trial-and-error basis. The disadvantages of the method are that it does not always work, it relies on the driller's experience and the trial-and-error technique can worsen the torsional vibration. In addition, the torsional vibration may be reduced at the expense of the drilling rate of penetration (e.g. in order to reduce the vibration, the required weight on bit and the drillstring rotational speed to give an optimum rate of penetration may not be achievable).

Another method of reducing drillstring torsional vibration is proposed in SPE (Society of Petroleum Engineers) article number 18049, entitled *Torque Feedback Used to Cure Slip-Stick Motion*, 1988. This method, called "Torque Feedback", proposes to measure the drillstring torque at the surface and to use the measurement as a feedback signal to manipulate the control system of the electrical motor which rotates the drillstring.

This technique is, however, difficult to apply in practice because of the difficulties involved in measuring the drillstring torque. The known method is based on the measurement of the mechanical strain induced in the drillstring by the torque. A torquemeter, comprising strain gauges, is positioned between the rotary table and the kelly. Such a torquemeter is for example described in U.S. Pat. No. 4,471,663. This method of measuring drillstring torque based on mechanical strain measurement is difficult to implement on a drilling rig. Because the drillstring torque has to be measured while the drillstring is rotating, the measurement of the mechanical strain must be transmitted via either a telemetry system or sliprings and brushes. A telemetry system, such as a radio link for example, requires a battery which rotates with the drillstring. The drilling operation must therefore be interrupted periodically for the battery replacement. On the other hand, the reliability and the maintainability of a sliprings/brushes system are questionable in such a severe environment as the top of the drillstring. In addition, the environment around the drillstring, where the torque measurement is required, is subjected to severe mechanical vibration and shock as well as contaminants and debris. Also, due to risk of explosion in that particularly sensitive area of the drilling rig, the electronic equipment must be specially built to comply with compulsory requirements and be certified. It is not easy to find certified electronic sensors and components which satisfy the requirements. Furthermore, in the majority of cases there is insufficient space for mounting a torque sensor within the rotary table.

SUMMARY OF THE INVENTION

The present invention relates to a method and apparatus for measuring the drillstring torque at the surface, which is suitable for use as a feedback parameter for the control of drillstring torsional vibration, without a need for measuring mechanical strain in a severe environment. The proposed method and apparatus do not present the disadvantages of the prior art.

More precisely, the invention concerns a method of determining the torque $T_s$ acting at the surface in a drillstring while drilling a borehole, the drillstring being rotated by rotating driving elements which include an electrical motor with an output shaft, the method comprising the steps of measuring the angular acceleration $\gamma$ of said shaft; measuring the torque $T_m$ of said motor; determining the moment of inertia Mt of said rotating driving elements; and determining the torque $T_s$ from the values of $\gamma$, $T_m$ and Mt. When the overall gear ratio G from the motor shaft to the drillstring is different than 1, it is then taken into account for determining the torque $T_s$.

Preferentially, the angular acceleration $\gamma$ is measured by sensing the angular position of said shaft and the torque $T_m$ of said motor is determined by measuring the electrical currents feeding said motor.

The invention also relates to an apparatus for determining the torque $T_s$ acting at the surface in a drillstring while drilling a borehole, the drillstring being rotated by rotating driving elements which include an electrical motor with an output shaft, said apparatus comprising means for measuring the angular acceleration $\gamma$ of said shaft, means for determining the torque $T_m$ of said motor, means for obtaining the moment of inertia Mt of said rotating driving elements and means for computing said torque $T_s$.

Said means for measuring the angular acceleration comprises a shaft encoder, a signal conditioner and a microprocessor.

The invention is particularly useful for minimizing the cyclic components of torque $T_s$ in a drillstring, by obtaining a signal characteristic of the variation $\Delta T_s$ of said torque $T_s$ and by using said signal as a feedback signal for the motor in order to minimize said variation $\Delta T_s$.

BRIEF DESCRIPTION OF THE DRAWINGS

The detailed description of the preferred embodiment of the invention will now be given, with reference to the accompanying drawings in which:

FIGS. 1 and 2 are sketches of a rotary table drilling system and a top drive drilling system, respectively;

FIG. 3 illustrates schematically a model of a rotary drilling system;

DETAILED DESCRIPTION OF PREFERRED EMBODIMENT

Figure 1:
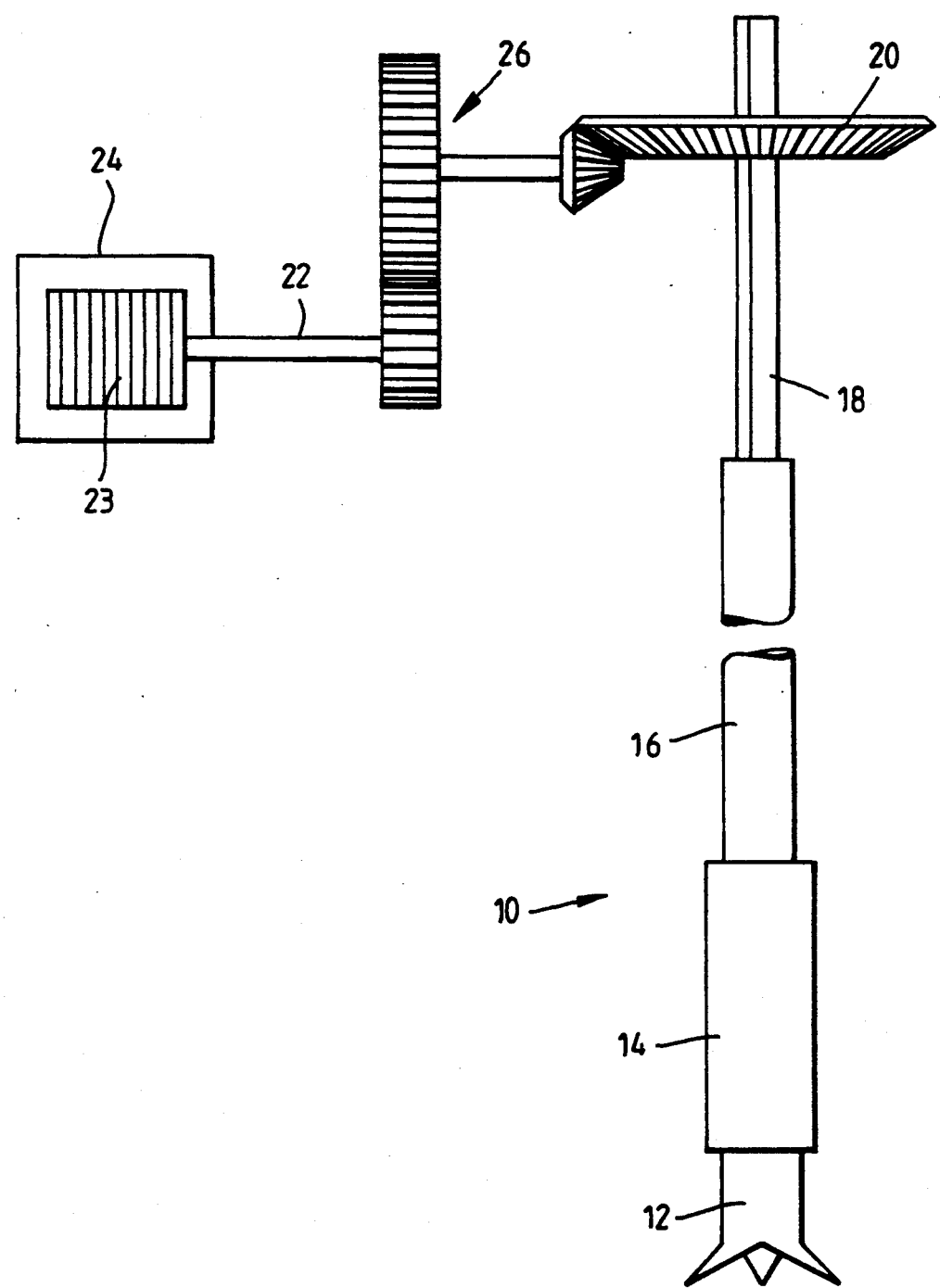

The rotary table drilling system of FIG. 1 comprises a drillstring 10 having a drillbit 12 attached at the lower end of a bottomhole assembly 14 and drillpipes 16. The bottomhole assembly is made of short and heavy thick pipes compared with the relatively thin and long drillpipes 16. The bottomhole assembly 14 is therefore rigid compared with the relative elasticity of the drillpipes. The means for rotating the drillstring 10, and therefore for rotating the drillbit 12, comprises at the surface a "kelly" pipe 18 screwed on top of the drillpipes 16 and having a square transverse section. The kelly 18 is driven in rotation by a rotary table 20. The kelly is vertically slideable in the rotary table. The shaft 22 of an electrical motor 24 is connected to the rotary table 20 by a gear assembly 26 and to the rotating winding 23 of the motor 24.

The top drive drilling system illustrated in FIG. 2 comprises the same drillstring 10 as previously, with the drillbit 12, the rigid bottomhole assembly 14 and the drillpipes 16. The shaft 22 of the electrical motor 24 is connected to a gear assembly 28 driving in rotation a pipe 30 which is screwed on top of the drillpipes 16. The motor 24 is usually a DC electrical motor, but it could also be an AC motor. The rotating winding is usually called the armature and the stationary winding is called the field winding.

Both systems of FIGS. 1 and 2 can be modelled, as shown in FIG. 3, by a torsional pendulum consisting of a top flywheel 32 and a bottom flywheel 34 linked together by a torsional spring 36. The latter represents the flexible drillpipes 16. The bottom flywheel 34 represents the drillbit 12 and bottomhole assembly 14. The top flywheel 32 comprises, for the drilling system of FIG. 1, the kelly 18, the rotary table 20, the gear assembly 26, the motor shaft 22 and the rotating winding 23 of motor 24. For the drilling system of FIG. 2, the top flywheel comprises the pipe 30, the gear assembly 28, the shaft 22 and the rotating winding 23.

It must be noted that the kelly 18 or the pipe 30 could alternatively be considered part of the drillstring 10 and not part of the top flywheel. The kelly 18 and pipe 30 are very short compared with the drillstring length and therefore their contribution would be considered negligible.

All the components of the top flywheel will be later on referred to as the rotating driving elements. The torque supplied by the electrical motor is called $T_m$, the torque applied to the top flywheel by the electrical motor is indicated by $T_M$ (which is equal to $GT_m$ wherein G is the overall gear ratio from the motor shaft to the drillstring), the resulting torque on the bottom flywheel by $T_B$ and the resulting torque on the drillstring at the surface by $T_s$. As previously indicated, these torques have different values because of the friction of the drillstring into the borehole and the relative elasticity for the drillpipes.

A drilling system, as modelled in FIG. 3, possesses a range of natural frequencies of torsional vibration. Small changes in the torsional resistances along the drillstring while drilling can excite a natural mode of torsional vibration which increases the cyclic components of drillstring torque $T_s$. Torsional vibration may escalate to the point when the drillbit stops completely, then accelerates to an excessive speed and then decelerates to stop again and so forth. This sequential movement of the drillbit is called the "stick-slip" motion.

In accordance with the present invention, instead of measuring the drillstring torque by measuring the mechanical strain, the drillstring torque $T_s$ is calculated based on a version of the well known Newton's second law of motion which states that the unbalanced torque applied to a rotating body is equal to the product of the moment of inertia of the body and its angular acceleration.

For a top drive or a rotary table drilling system, the rotating body is made up of the rotating driving elements, i.e. the components of the top flywheel. The unbalanced torque applied to the body is the difference between the drillstring torque $T_s$ and the torque $T_M$ applied by the motor.

The Newton's second law can therefore be written as:

$$T_s - T_M = Mt.(\gamma/G) \tag{1}$$

Mt being the moment of inertia of the rotating driving elements and, $(\gamma/G)$ being their angular acceleration, G being the overall gear ratio and $\gamma$ being the motor angular acceleration.

Preferentially the motor torque $T_m$ is determined by measuring the electrical currents $I_A$ of the rotating winding and $I_F$ of the field winding of the motor.

Figure 4:
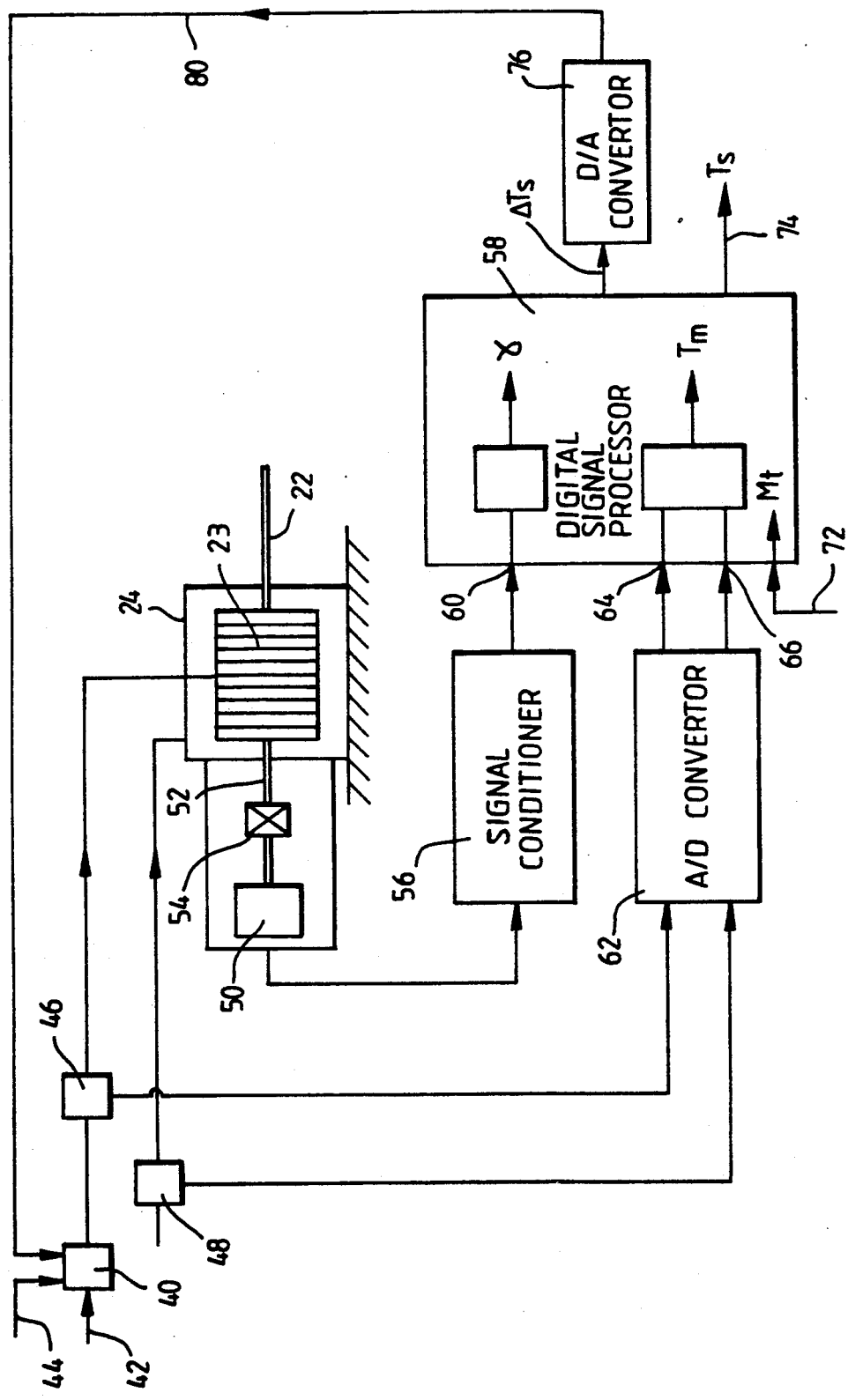
FIG. 4 is a block-diagram showing the different elements of the apparatus.

Turning to FIG. 4, which is a block diagram of the apparatus in accordance with the present invention, the rotating circuit of winding 23, connected to the shaft 22 of the electrical motor 24, is fed by current $I_A$ (the armature current for a DC motor) supplied by a regulator 40 which receives the supply current at its input 42. A signal is applied by the driller on the other input 44 so as to set the desired rotational speed of the motor. The regulator adjusts the current $I_A$ in order to keep said speed constant. The current $I_A$ is measured by a current sensor 46. The current $I_F$ of the field (stationary) circuit or winding of the motor is measured by current sensor 48.

Measurement of motor acceleration $\gamma$

An optical shaft encoder 50 is coupled to the motor tail shaft 52 (linked to the rotating winding) through a flexible coupling 54. The encoder 50 senses the angular position of the motor shaft and delivers an angular position signal, made up of a series of pulses, to a signal conditioner 56 which filters the signal in order to eliminate its noisy components due to the small oscillations of the shaft. The filtered signal is applied to a real time digital processor 58 (the microprocessor Intel 286, for example) at the input 60 for computing the angular acceleration $\gamma$ from the variations of the angular position of the shaft. This is done by double differentiation of the angular position. The rotational speed of the shaft is first computed by accumulating clock pulses (supplied by an 8 Megahertz clock internal to the processor 58) over a predetermined angular displacement of the motor shaft 52. This predetermined angular displacement is given by the shaft encoder 50 and is made to be proportional to the motor shaft speed by design. Then the motor's angular acceleration is computed from a set of values of clock pulses accumulated, using a "central difference" algorithm (algorithm which is used to compute a rate of change of data). A suitable "central difference" algorithm is for example the one described in *Elementary Numerical Analysis, An Algorithm Approach*, Chapter 7, Pages 294–298, McGraw-Hill International Book Company. Other known methods of determining the rotational acceleration of a shaft from its angular position sensed by a shaft encoder could be used.

Motor's angular accelerations can be accurately measured within a wide range (from about 0.070 to 5 Rad./sec./sec.) with a minimum of phase delay.

Measurement of motor torque $T_m$

This is done preferentially by measuring the currents $I_A$ and $I_F$ with the current sensors 46 and 48, respectively. The signals delivered by these sensors are first filtered to attenuate undesirable high-frequency components and converted into digital form by the signal conditioner and A/D converter 62 and then supplied in 64 and 66 to the signal processor 58. Because the time taken to process the shaft encoder signals in the signal conditioner 56 is larger than the time taken to process the current signals in the circuit 62 (the time difference is about 30 milliseconds), this circuit 62 also includes a delay line to compensate for the time difference in data processing, so that the data supplied to the processor in 60, 64 and 66 are in phase. This delay can be given by the processor also.

Figure 5:
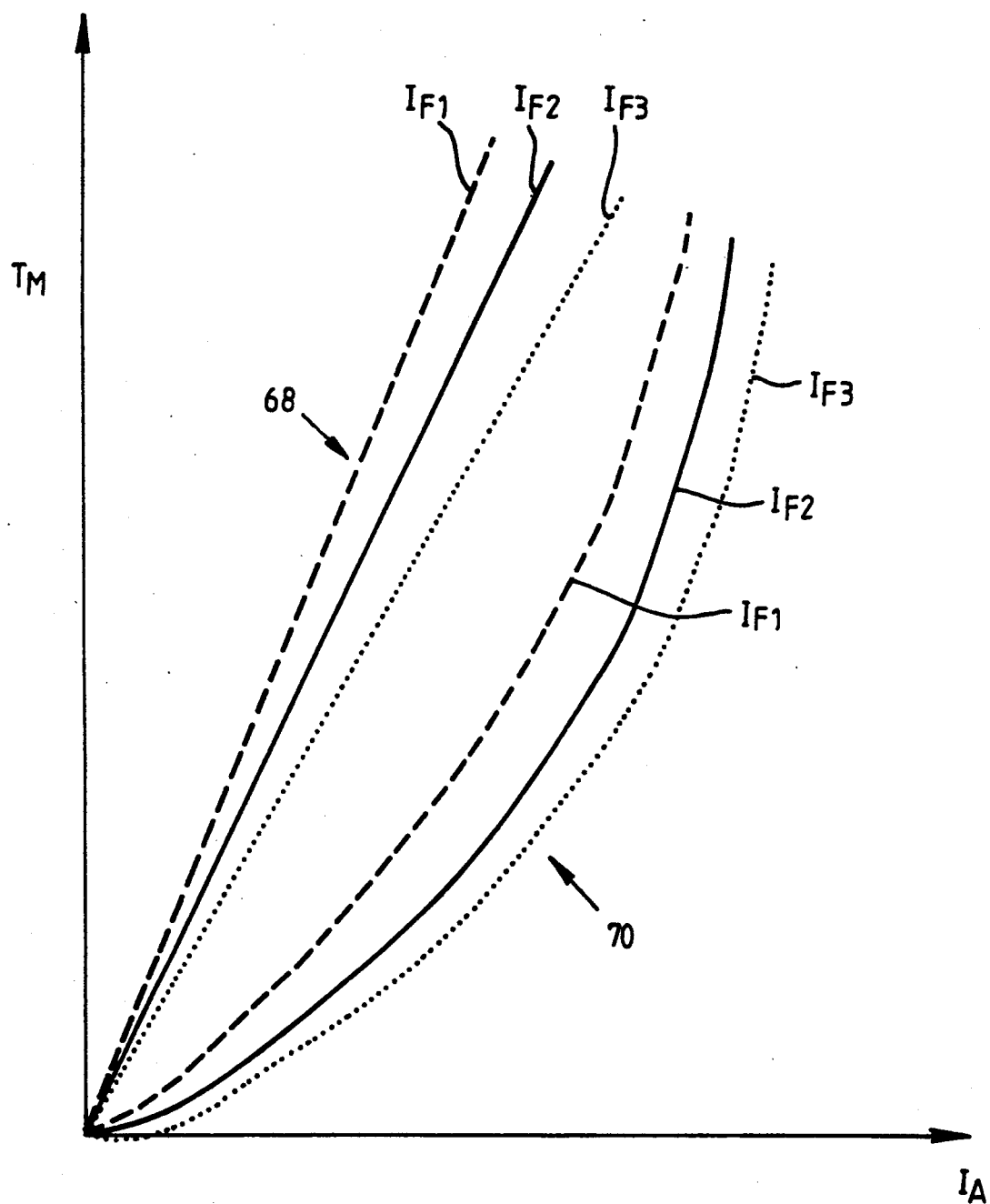
FIG. 5 represents the variations of motor's torque $T_m$ versus motor's current $I_A$, for different values of motor's current $I_F$.

From the values of $I_A$ and $I_F$, the motor's torque $T_m$ is determined. The value of $T_m$ as a function of $I_A$ and $I_F$ can usually be obtained from the motor's manufacturer. In that case, the different values of $T_m$ as a function of $I_A$ and $I_F$ are entered into a memory of the processor 58. If the values cannot be obtained from the manufacturer, then it is possible to draw experimentally the curves given in FIG. 5 which represent, for a DC motor, the motor torque $T_m$ as a function of the armature current $I_A$ for three different values $I_{F1}$, $I_{F2}$ and $I_{F3}$ of the field current. The set of linear curves 68 is for a shunt wound motor and the set of parabolic curves 70 is for a series wound motor. For an AC motor, the relationship between $T_m$, $I_A$ and $I_F$ is more complex but can be determined as well (if not supplied by the motor's manufacturer).

Determination of Gear Ratio G

The gear ratio G can be computed from the known geometry of the gears. It could also be measured by measuring the angular displacement of the rotary table and the motor shaft.

Determination of Moment of inertia Mt

The Moment of inertia Mt of the rotating driving elements can be either computed or measured. It is computed from the known geometry and mass of the rotating driving elements. It could also be measured by uncoupling the rotating driving elements from the drillstring (for example, in FIG. 1 by disconnecting the kelly 18 from the drillpipes 16 if the kelly is considered as one part of the rotating driving elements or, if not, by withdrawing the kelly 18 from the rotary table 20) and then by switching on the motor and measuring $I_A$, $I_F$ and $\gamma$. The drillstring torque $T_s$ being obviously null in that case, the value of Mt can be determined from the values of the motor acceleration $\gamma$, gear ration G and torque $T_m$ (obtained from the values of $I_A$ and $I_F$) by $Mt = |(G^2/\gamma) \times T_m|$ The value of Mt is entered into a memory of the signal processor 58 at 72.

The values of the four parameters $\gamma$, $T_m$, G and Mt are now in the signal processor 58, wherein the value of drillstring torque $T_s$ can easily be computed from equation (1). This value $T_s$ is given at output 74.

In addition to obtaining the drillstring torque $T_s$, in accordance with one aspect of the present invention the variation $\Delta T_s$ in the values of $T_s$ is used as a feedback parameter for the control of the drillstring torsional vibration, by controlling the current $I_A$ to stabilize the value of $T_s$. First, the mean value of $T_s$ eliminated by a filter within the signal processor 58, to keep only the variation $\Delta T_s$ of $T_s$. This signal $\Delta T_s$ is then amplified and its value is anticipated to compensate for the time delay taken by the apparatus to compute $\Delta T_s$. This technique of anticipation is well known in feedback control systems.

For example, an algorithm can be used to compute the rate of change of $\Delta T_s$.

The anticipated signal $\Delta T_s$ is then converted into an analog signal by the D/A converter 76 and supplied by the feedback loop 80, as a feedback signal, to the regulator 40 to modify the value of $I_A$ in order to minimize the variation $\Delta T_s$. As an example, the signal $\Delta T_s$ can be used to modulate the speed command and/or the current command of the motor drive regulator.

I claim:

1. A method of determining torque $T_s$ acting at the surface in a drillstring while drilling a borehole, said drillstring being rotated by rotating driving elements which include an electrical motor with an output shaft, the method being characterized by the steps of:
    measuring the angular acceleration $\gamma$ of said output shaft by sensing the angular position of said shaft;
    measuring the torque $T_m$ of said motor;
    determining the moment of inertia Mt of said rotating driving elements; and
    determining the torque $T_s$ from measured values of $\gamma$, $T_m$ and the determined moment of inertia Mt.

2. A method as claimed in claim 1, further comprising the steps of determining a gear ratio G from the motor shaft to the drillstring and determining the torque $T_s$ by taking into account the gear ratio G.

3. A method as claimed in claim 1, wherein the angular acceleration $\gamma$ is computed by double differentiation of said shaft angular position.

4. A method as claimed in claim 1, wherein the torque $T_m$ of said motor is determined by measuring electrical current feeding said motor.

5. A method as claimed in claim 4, wherein said electrical motor comprises a rotating circuit coupled to said shaft and a stationary circuit, the method further comprising measuring the electrical current $I_A$ in said rotating circuit and the electrical current $I_F$ in the stationary circuit, the torque $T_m$ being derived from the values of $I_A$ and $I_F$.

6. A method as claimed in claim 2, comprising computing said gear ratio G from the geometry of the rotating driving elements.

7. A method as claimed in claim 1, comprising computing said moment of inertia Mt from the geometry and the mass of said rotating driving elements.

8. A method of determining torque $T_s$ acting at the surface in a drillstring while drilling a borehole, said drillstring being rotated by rotating driving elements which include an electrical motor with an output shaft, the method being characterized by the steps of:

measuring the angular acceleration $\gamma$ of said output shaft;

measuring the torque $T_m$ of said motor;

determining a gear ratio G from the motor shaft to the drillstring;

determining the moment of inertia Mt of said rotating driving elements by disconnecting said rotating driving elements from said drillstring, switching on said motor, measuring values of said shaft angular acceleration $\gamma$ and said motor torque $T_m$ and calculating said moment of inertia Mt from the measured values of $\gamma$ and $T_m$ and the known value of gear ration G; and determining the torque $T_s$ from measured values of $\gamma$ $T_m$, the known value of gear ratio G and the determined moment of inertia Mt.

9. An apparatus for determining the torque $T_s$ acting at the surface in a drillstring while drilling a borehole, the drillstring being rotated by rotating driving elements which include an electrical motor with an output shaft, said apparatus comprising means including a shaft encoder, a signal conditioner and a microprocessor, for measuring the angular acceleration of said shaft, means for determining the torque $T_m$ of said motor, means for obtaining the moment of inertia Mt of said rotating driving elements and means for computing said torque $T_s$.

10. Apparatus as claimed 9, wherein said electrical motor further comprises a rotating circuit coupled to said shaft and a stationary circuit, said means for determining the torque $T_m$ comprises current sensors for sensing values of current $I_A$ and $I_F$ in said rotating and stationary circuits respectively, and means for determining said torque $T_m$ from said values of $I_A$ and $I_F$.

11. Apparatus as claimed in claim 10, further comprising a regulator to control the value of current $I_A$, means for obtaining a signal characteristic of the variation $\Delta T_s$ of $T_s$ by eliminating the mean value of $T_s$ and a feedback loop to supply said signal to said regulator so as to minimize the variation $\Delta T_s$.

12. A method of controlling the drilling of a borehole with a drillstring, said drillstring being rotated by rotating driving elements which include an electrical motor with an output shaft, the method being characterized by the steps of:

measuring the angular acceleration $\gamma$ of said output shaft output shaft by sensing the angular position of said shaft;

measuring the torque $T_m$ of said motor;

determining the moment of inertia Mt of said rotating driving elements;

determining the torque $T_s$ from measured values of $\gamma$, $T_m$ and the determined moment of inertia Mt;

generating a control signal according to the determined torque $T_s$; and applying the control signal to the motor so as to reduce fluctuations in torque experienced by the drillstring.

* * * * *